J. G. JACKSON.
BAKING PAN.
APPLICATION FILED APR. 26, 1918.
1,302,661.
Patented May 6, 1919.
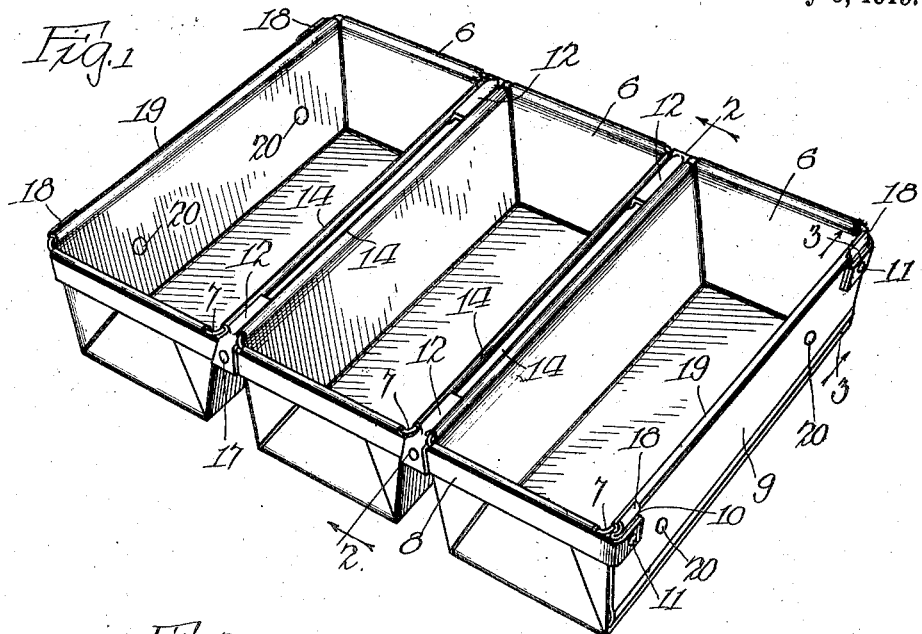
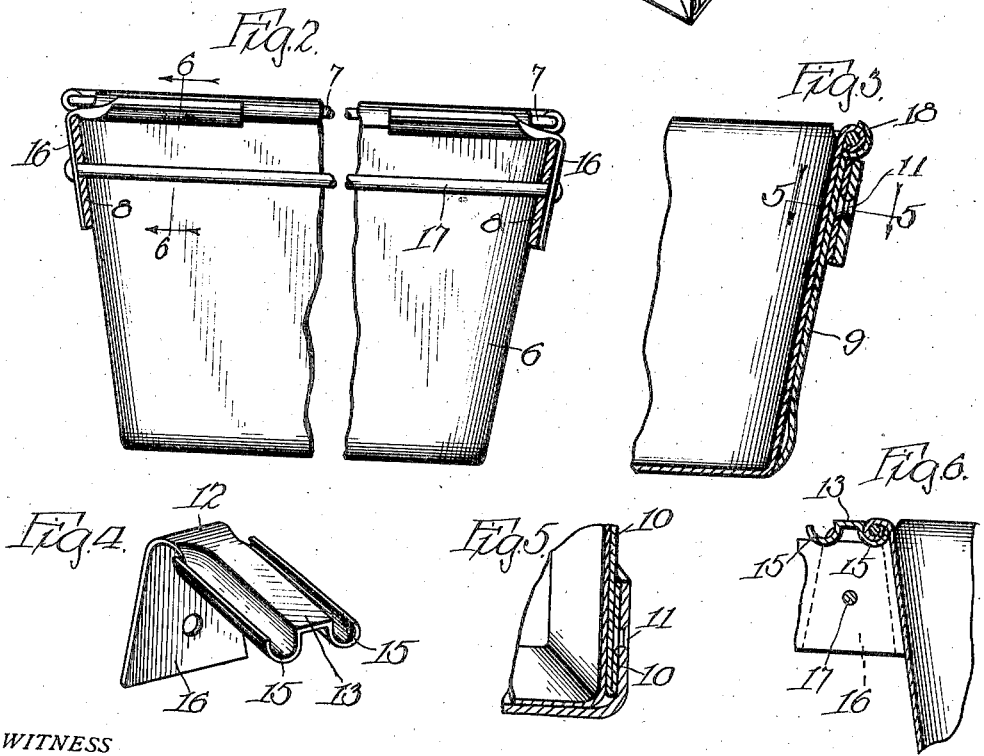
WITNESS
INVENTOR.
Joseph George Jackson.
BY Brown & Nissen
ATTORNEYS.

UNITED STATES PATENT OFFICE.

JOSEPH GEORGE JACKSON, OF CHICAGO, ILLINOIS, ASSIGNOR TO EDWARD KATZINGER COMPANY, OF CHICAGO, ILLINOIS, A CORPORATION OF ILLINOIS.

BAKING-PAN.

1,302,661.  Specification of Letters Patent.  Patented May 6, 1919.

Application filed April 26, 1918. Serial No. 230,867.

*To all whom it may concern:*

Be it known that I, JOSEPH GEORGE JACKSON, a citizen of the United States, residing at Chicago, in the county of Cook and State of Illinois, have invented certain new and useful Improvements in Baking-Pans, of which the following is a specification.

My invention relates to multiple baking pans such as used by bakers, and the like, and the object of this improvement is the provision of a simple and efficient baking pan of the character mentioned, and one which is durable and easily kept clean and sanitary.

Other objects will appear hereinafter.

An embodiment of my invention is shown in the accompanying drawing, forming a part of this specification, and in which—

Figure 1 is a perspective view of a multiple baking pan embodying my invention.

Figs. 2 and 3 are enlarged fragmental sections taken on lines 2—2 and 3—3, respectively, of Fig. 1.

Fig. 4 is an enlarged perspective view of a pan-securing member used in the construction.

Fig. 5 is a fragmental section taken on line 5—5 of Fig. 3; and

Fig. 6 is a fragmental section taken on line 6—6 of Fig. 2.

Referring more particularly to the drawing I have shown a multiple baking pan consisting of three nested pans 6. It will be apparent, however, that fewer or a greater number of pans may be included in the nest of pans when so desired. All that will be necessary is to make the frame of a size sufficient to hold the required number of pans. The pans 6 may be alike in size and construction and are provided with wires 7 turned in around their rims in the usual manner of wiring rims of pans, such as baking pans.

The frame for my multiple pan preferably consists of two side bars 8 which extend across the ends of all of the pans and have their ends turned over on the remote sides of the outside pans of the set. End plates 9 are provided on the remote sides of the two end pans. The connection between the end plates 9 and the side bars 8 are especially designed to make the pan easily assembled. The arrangement I prefer to use is to form ears 10 on the ends of the plates 9 near the upper corners of the latter, which when the pans are complete are folded back tightly on the outer sides of the end plates 9 and have the ends of the bars 8 secured to them in some desirable manner, such as by rivets 11.

I provide members 12 between the adjacent rims of all of the pans which serve as braces and also secure the pans to the side bars 8. These members 12 are preferably formed with a plane portion 13 of a width which will fit tightly between the adjacent rims 14 of two pans 6. The longitudinal edges of the plane portion 13 are curved into slightly more than half circles forming portions 15 which are clamped around on the wired rims of the adjacent edges 14, as indicated in Fig. 6. Each of the members 12 has a portion 16 which engages the side of one of the side bars 8 and secured thereto by a suitable means, such as a rod 17. I preferably form the rods 17 in lengths which will extend across the frame bars 8 so that the rods 17 will hold the bars 8 tightly against the ends of the pans 6 and also clamp the parts 16 tightly against the bars 8, see particularly Fig. 2. This form of rod 17 makes the construction quite rigid.

On the end plates 9, near the upper corners, I provide short ears 18 which are bent up around the wire rims 19 of the outermost pans. The members 12 and 18 provide means for securely locking the pans 6 between the frame 8—9, making a very rigid construction. When desired rivets 20 may be provided in the end plates 9 for holding the latter securely against the outer sides of the end pans 6. These rivets 20 may be dispensed with when so desired. It is always desirable in baking pans to form them without rivets showing on the inner sides of the pans, and for this reason I prefer to do away with the rivets 20 when the construction will permit.

While I have illustrated and described the preferred form of my invention, I do not desire to be limited to the precise details set forth, but desire to avail myself of such variations and changes as come within the scope of the appended claims.

I claim:—

1. A multiple baking pan comprising a plurality of spaced pans each having a wire frame around its rim; bars extending along the ends of said spaced pans; and members secured to said bars between the pans, each member having a narrow plate portion extending between and rigidly bracing the end portions of two adjacent pan rims apart and portions at the longitudinal edges of said plane portion disposed around the wire frames under the metal of the pans rigidly securing said members to said pans.

2. A multiple baking pan comprising a plurality of spaced pans each having a wire frame secured around its rim; bars extending along the ends of said spaced pans; and members secured to said bars between the pans, each member having a narrow plane portion with its upper side substantially flush with the tops of the adjacent pan rims and disposed between and bracing said rims, there being portions along said narrow plane portions curved longitudinally through more than half circles and disposed around the wire frames under the top edge portions of the pans.

3. A multiple baking pan comprising a plurality of spaced pans each having a wire frame secured around its rim; bars extending along the ends of the spaced pans; and a set of two members between each pair of adjacent pan rims with each member adjacent one of said bars, each of said members having parts of its longitudinal edges disposed around the wire frame of the adjacent pan rims and one end portion secured to one of said bars, said members being short and obstructing comparatively little of the spaces between said pans.

4. A multiple baking pan comprising a plurality of spaced pans each having a wire rim; a frame substantially rectangular extending around all of said pans; two members at the ends of each space between said pans, each member being disposed under the metal of the pan walls on the wires in the rims of the adjacent pans; and a rod extending across the frame between two adjacent pan edges, rigidly securing said members to the frame and holding the sides of the frame from spreading.

5. A multiple baking pan comprising a plurality of spaced pans each having a wire frame disposed around in its rim; bars extending along the ends of said spaced pans; a set of two members between each pair of adjacent pan rims, each of said members having parts of its longitudinal edges disposed around the wire frames of the adjacent pan rims and one end portion disposed against one of said bars, said members being comparatively short and obstructing little space between said pans; and a rod disposed through said bars and the portions of said members engaging said bars rigidly securing said members to said bars and holding the latter against spreading.

6. A multiple baking pan comprising a plurality of pans; end plates disposed on the remote sides of the outermost pans; bars disposed along the ends of said pans and having their ends extending over said end plates; ears on the end plates disposed against and secured to the ends of said bars; ears formed on the top edges of the end plates bent up over the rims of the outermost pans securing the latter to said end plates; short members having portions extending into and rigidly held by the adjacent pan rims near the ends of the pans with a comparatively long space between the members between each pair of adjacent pan rims; and means securing said members to said bars and holding the latter against the ends of the pans.

7. A multiple baking pan comprising a plurality of pans; end plates disposed on the remote sides of the outermost pans; ears on the ends of said end plates turned back upon the remote sides of the latter; bars disposed along the ends of all of the pans and having their ends bent over and secured to said ears; and ears at the corners on the top edges of said end plates extending over the rims of the outermost pans holding the latter against said plates.

8. A multiple baking pan comprising a plurality of pans; end plates disposed on the remote sides of the outermost pans; bars disposed along the ends of all of the pans and having their ends secured to said end plates; and ears at the top corner portions of said end plates extending over the rims of the outermost pans and holding the latter against said end plates.

In testimony whereof I have signed my name to this specification on this 20th day of April, A. D. 1918.

JOSEPH GEORGE JACKSON.